United States Patent
Chini et al.

(10) Patent No.: US 6,772,795 B2
(45) Date of Patent: Aug. 10, 2004

(54) PIPES MADE OF POLYMERIC MATERIAL

(75) Inventors: Fabrizio Chini, Rovereto (IT); Renzo Moschini, Bologna (IT); Emanuela Pieri, Bologna (IT)

(73) Assignee: Magneti Marelli Powertrain S.p.A., Corso Ferruci (IT)

( * ) Notice: Subject to any disclaimer, the term of this patent is extended or adjusted under 35 U.S.C. 154(b) by 0 days.

(21) Appl. No.: 10/439,294

(22) Filed: May 16, 2003

(65) Prior Publication Data

US 2004/0065378 A1 Apr. 8, 2004

(30) Foreign Application Priority Data

May 17, 2002 (IT) ..................................... BO2002A0304

(51) Int. Cl.⁷ ................................................ F16L 9/14
(52) U.S. Cl. ..................... 138/141; 138/137; 428/36.91
(58) Field of Search ............................... 138/137, 141; 428/36.91; 123/337

(56) References Cited

U.S. PATENT DOCUMENTS

| | | | | |
|---|---|---|---|---|
| 4,912,193 A | * | 3/1990 | Dicke et al. ................ 528/193 |
| 5,037,939 A | * | 8/1991 | Eckhardt et al. ............ 528/193 |
| 5,254,624 A | * | 10/1993 | Heger et al. ................ 525/133 |
| 5,256,719 A | * | 10/1993 | Sham et al. ................. 524/436 |
| 5,330,810 A | * | 7/1994 | Nishino .................... 428/36.91 |
| 5,914,160 A | * | 6/1999 | Matsufuji et al. .......... 428/34.9 |
| 6,168,362 B1 | * | 1/2001 | Tucker et al. ............... 411/442 |
| 6,443,185 B1 | * | 9/2002 | Katayama et al. .......... 138/137 |
| 6,491,020 B2 | * | 12/2002 | Kotchi et al. ............... 123/337 |
| RE38,087 E | * | 4/2003 | Yokoe et al. ............ 428/36.91 |
| 6,626,152 B1 | * | 9/2003 | Deangelis et al. .......... 123/468 |
| 2002/0144808 A1 | * | 10/2002 | Jones ........................ 165/173 |

OTHER PUBLICATIONS

European Search Report; EP 03 01 1259; dated Aug. 21, 2003.
English Abstract of DE 1 9615438, dated Jan. 23, 1997.
English Abstract of US 2002117646, dated Aug. 29, 2002.
English Abstract of US 6354267, dated Mar. 12, 2002.
English Abstract of EP 1033224, dated Sep. 6, 2000.

\* cited by examiner

*Primary Examiner*—James Hook
(74) *Attorney, Agent, or Firm*—Arent Fox, PLLC

(57) ABSTRACT

A pipe constituted by an inner wall produced with a first high-performance thermoplastic polymeric material having a distortion temperature under load in accordance with standard HDT-A ISO75 of at least 275° C. and an outer wall produced from a second thermoplastic material belonging to the same family of chemical polymers as the high-performance thermoplastic material and coinjected therewith for production of the pipe itself.

5 Claims, 1 Drawing Sheet

PIPES MADE OF POLYMERIC MATERIAL

The present invention relates to novel pipes made of polymeric material.

In particular the present invention relates to novel pipes made of polymeric material capable of being used for throttle bodies.

BACKGROUND OF THE INVENTION

Pipes of this type accommodate within them a mobile gate member, which, by co-operating with the inner wall of the pipe, selectively controls the flow rate of fluid through the pipe itself. It is obvious that in pipes of this type there is a necessity for the inner wall to be constituted by a material that is capable of ensuring effective and extended activity of the throttle valve. Such materials will here and hereinafter be denoted "high-performance" materials.

As is known to the person skilled in the art, high-performance polymeric materials are those polymeric materials that have intrinsic properties such as to give them excellent mechanical, chemical and thermal properties.

In the present invention, the essential property that identifies a high-performance polymeric material is a distortion temperature under load in accordance with standard HDT-A ISO75 of no less than 275° C.

High-performance polymeric materials that meet the above-stated requirements have now been available for some time. However, such materials are particularly expensive, to the extent that using them to produce the entire pipe is not really feasible.

One possible solution is to make a pipe having a metal core coated with a high-performance polymeric material. In this solution, the connection between the polymeric material and the metal core is purely mechanical. While such a solution solves the problem relating to the cost of the pipe and to the presence of the high-performance polymeric material in the inner wall, it does suffer from a problem of progressive detachment that, as time passes, occurs between the polymeric part and the metal part of said pipe.

SUMMARY OF THE INVENTION

The aim of the present invention is to provide novel pipes having technical properties that free them from the problems of the prior art.

The subject-matter of the present invention is a pipe comprising an inner wall constituted by a first high-performance thermoplastic polymeric material having a distortion temperature under load in accordance with standard HDT-A ISO75 of at least 275° C.; said pipe being characterised in that it comprises an outer wall constituted by a second thermoplastic material belonging to the same family of chemical polymers as said first high-performance thermoplastic material.

The pipe is preferably produced by means of coinjection of the first thermoplastic material with the second thermoplastic material.

The first and second thermoplastic materials preferably belong to the family of polyamides or polyesters.

The first and second thermoplastic materials preferably belong to the family of polyamides.

BRIEF DESCRIPTION OF THE DRAWINGS

The purpose of the following illustrative and non-limiting example is to provide a better understanding of the invention with reference to the attached figures, in which.

DETAILED DESCRIPTION OF THE INVENTION

Figure 2:
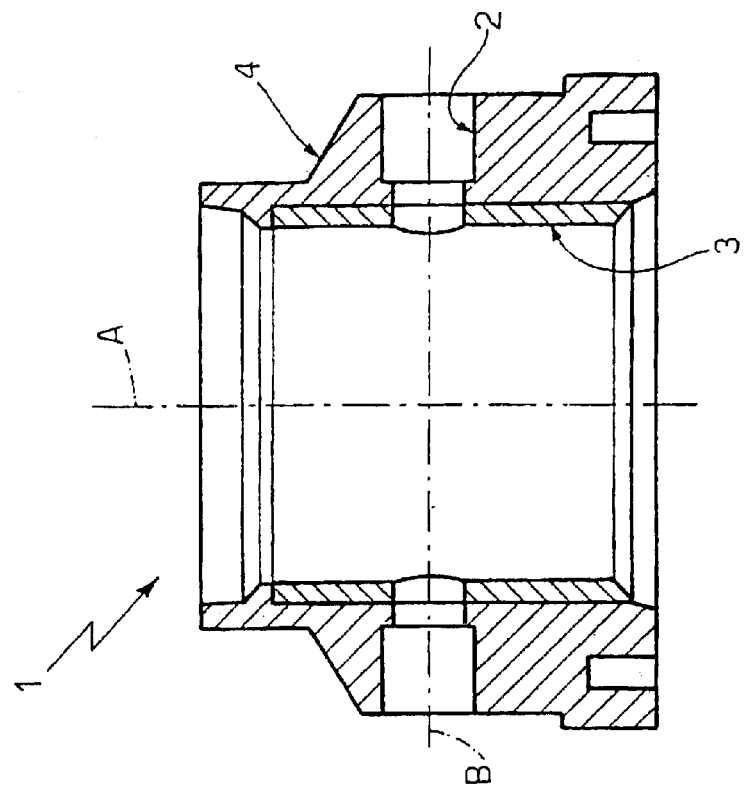
FIG. 2 is a section along the line II—II in FIG. 1.
Figure 1:
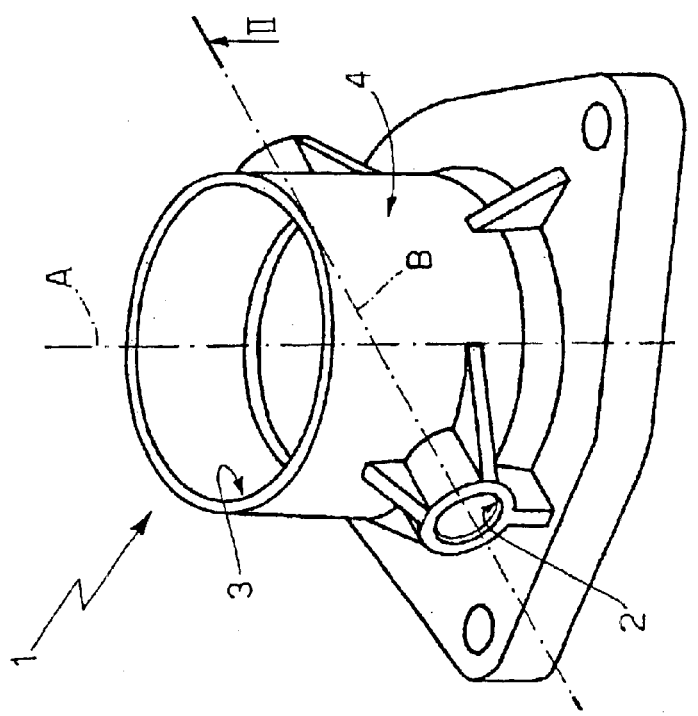
FIG. 1 is a perspective view from above of a preferred embodiment of the pipe that is the subject-matter of the present invention.

In FIGS. 1 and 2, 1 denotes overall a pipe of substantially circular section, which pipe has a longitudinal axis A and is capable of being connected to an intake manifold (not shown) of a spark-ignition engine.

The pipe 1 is capable of accommodating therein a gate disk (not illustrated) attached to a shaft (not illustrated) mounted rotatably in suitable tubular seats 2 provided in the pipe 1 along a diameter of the section of the pipe 1 itself and defining an axis of rotation B perpendicular to the axis A.

The pipe 1 comprises an inner wall 3 produced from a high-performance thermoplastic material designated PPA GF33 (commercial name Amodel AS1133HS) and an outer wall 4 produced from a thermoplastic material designated PA66 GF30 (commercial name Technyl A210V30).

The pipe of the present invention is produced by the coinjection method, which substantially involves moulding two different materials in succession. In particular, the material having a lower melting point is moulded first and then, but before said material cools, the material having a higher melting point is moulded.

Because both materials belong to the same family of polyamides and are thus chemically compatible, the materials can combine intimately, so preventing different coefficients of thermal expansion, differing thermal behaviour and mechanical stresses from bringing about the loss of adhesion typical of pipes comprising a mechanical connection system.

Furthermore, the present invention makes it possible to produce pipes with low production costs. In fact, the pipes of the invention have parts made from costly high-performance material only in those zones in which such material is technically necessary, while the other parts are constituted by a low cost material.

Finally, it is obvious that modifications and variants can be made to the pipes that are the subject-matter of the invention, if they do not extend beyond the scope of the claims.

In particular, the pipe can have a substantially rectangular section, in which the gate member, being a substantially rectangular in shape, is hinged on one side of the pipe itself.

What is claimed is:

1. Pipe (1) comprising an inner wall (3) constituted by a first high-performance thermoplastic polymeric material having a distortion temperature under load in accordance with standard HDT-A ISO75 of at least 275° C.; said pipe being characterised in that it comprises an outer wall (4) constituted by a second thermoplastic material belonging to the same family of chemical polymers as said first high-performance thermoplastic material.

2. Pipe according to claim 1, characterised in that it is produced by coinjection of said first thermoplastic material with said second thermoplastic material.

3. Pipe according to claim 1, characterised in that said first and said second thermoplastic materials belong to the family of polyamides or polyesters.

4. Pipe according to claim 3, characterised in that said first and said second thermoplastic materials belong to the family of polyamides.

5. Use of the pipe according to claim 1 for throttle bodies.

* * * * *